March 3, 1970 W. BROUWER 3,498,695

PRESSURE COMPENSATED OPTICAL DEVICE

Filed Oct. 11, 1966

INVENTOR.
WILLEM BROUWER
BY Robert J. Schiller
ATTORNEYS

United States Patent Office 3,498,695
Patented Mar. 3, 1970

3,498,695
PRESSURE COMPENSATED OPTICAL DEVICE
Willem Brouwer, Lexington, Mass., assignor to Sanders Associates, Inc., Nashua, N.H., a corporation of Delaware
Filed Oct. 11, 1966, Ser. No. 585,882
Int. Cl. G02b 3/12, 7/02
U.S. Cl. 350—179                   4 Claims

ABSTRACT OF THE DISCLOSURE

An optical system in which the shift in focal length with changes in ambient atmospheric pressure in minimized by selecting the $n$ optical surfaces of the system according to the criterion that the sum $$\sum_{1-i}^{n} h_i D_i P_i$$

tends to zero where for the $i$th surface, $h$ is the distance normal to the optical axis of the system from the intersection of a given paraxial ray and the surface D is the angular deviation of the ray due to refraction at the surface, and $P_i$ is $\mu\mu'/\mu'-\mu$, $\mu$ and $\mu'$ being respectively the indices of refraction of the lens material and air on respective sides of the surface. One variation of the device varies the pressure between selected lens surfaces as a function of some parameter of the ambient atmosphere.

---

This invention relates to optics, and more particularly to compensation of an optical system for changes in ambient atmospheric pressure.

In a multiple lens system wherein two or more lenses are separated by vented "air" spaces, changes in ambient air pressure will generally cause corresponding changes in the focus of the system. For example, in high altitude photography, as the air density becomes more rarefied, the index of refraction of the interlens air spaces changes. Thus, the lens system becomes more refractive and the focus shifts closer to the lens system. Typically, compensation for such shift has involved physical translation of one or more lens elements such as in the device described in U.S. Patent No. 2,470,455.

The present invention has as its principal object means whereby the lens system is compensated for changes in air pressure outside the lens system, without moving any of the lens elements.

A further object of the invention is to provide a system for compensating a multiple lens structure by controlling air pressure in one or more "air" spaces of the structure, whereby the image plane of the lens structure remains substantially fixed in space despite uncontrolled changes in ambient air pressure outside of the lens structure.

Yet other objects of the present invention are to provide lens systems compensated for ambient air pressure changes by having one or more inter-lens air spaces sealed and a predetermined air pressure established in the sealed air space or spaces; to provide lens systems compensated for ambient air pressure changes by having one or more air-spaces in the system sealed from the ambient atmosphere, and means for controlling the pressure within the sealed spaces as a function of one or more characteristics of the ambient atmosphere; and to provide a simple, rugged, inexpensive system for compensating a multiple lens system for ambient atmospheric pressure changes.

These and other objects of the invention will in part be obvious and will in part appear hereinafter. The invention accordingly comprises the several steps and the relation of one or more such steps with respect to each of the others which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 1:
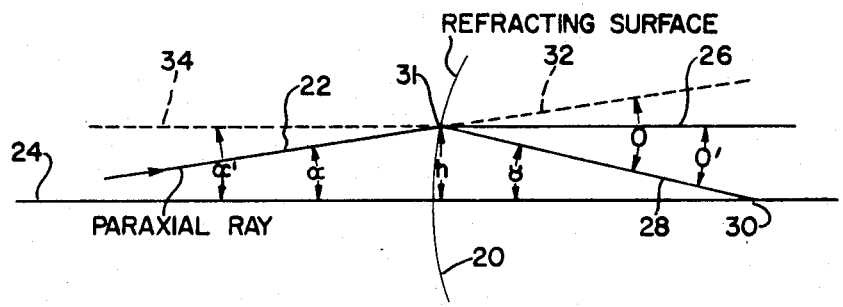
FIG. 1 is a graphical construction of the refraction of a paraxial ray.

The basis for the present invention can be expediently explained by consideration of the optical diagram of FIG. 1. In the latter there is shown an arcuate refractive surface 20 separating two media of different refractive indices, and a paraxial light ray 22 impinging on surface 20 at an angle $\alpha$ with respect to the optical axis 24 of surface 20. Light ray 22, being refracted, continues in the different medium as ray 26 at an angle $\varphi'$ with respect to the radius of curvature 28 extending from center of curvature 30 of surface 20 to point 31 of intersection of ray 22 with surface 20. Imaginary line 32, the extension of ray 22 through point 31 as if there were no refracting surface forms an angle $\varphi$ with radius 28. Similarly, imaginary line 34, the extension of ray 26 through point 31 as if there were no refracting surface, forms an angle of $\alpha'$ with axis 24. The shortest distance from point 31 to axis 24 is denoted as $h$.

Now, it will be apparent that the angular deviation of ray 22 due to refraction at the surface is (1) $$D = \alpha - \alpha' = \varphi - \varphi'$$

One can define a coefficient C of change in the focal plane of the refractive surface for a given paraxial ray as (2) $$C = hDP\left(\frac{d\mu'}{\mu'} - \frac{d\mu}{\mu}\right)$$

in which $\mu'$ is the refractive index of a first medium to one side of the surface, $\mu$ is the refractive index of another medium on the other side of the surface, and P is defined as follows:

(3) $$P = \frac{\mu\mu'}{\mu' - \mu}$$

If $\mu$ and $\mu'$ respectively are the indices of refraction of air and glass, and the air medium is open to the ambient atmosphere then, (4) $$d\mu = f(p) \text{ and } d\mu' = 0$$

where $p$ is the ambient air pressure.

In such case, using Equation 2 to trace the paraxial ray through a number of refractive surfaces one finds (5) $$C_{air} = \frac{f(p)}{\mu}\left(\sum_{i=0}^{n} h_i D_i P_i\right)$$

in which the index $i$ refers to the $i^{th}$ surface.

Thus, in order that there be no shift of the focal plane of a system of refractive surfaces with changes in air pressure (i.e. $C_{air} = 0$), the necessary condition is (6) $$\sum_{i}^{n} \pm h_i D_i P_i = 0$$

the sign being determined by whether the air is to the right or left of the refractive surface.

Now if one considers an optical system of a number of thin elements separated by spaces open to air pressure, then applying Equation 2 one finds (7)
$$C_{air} = d\mu_{air} \sum_{i=1}^{n} h_i^2 D_i \frac{\mu'}{\mu'} - 1$$

in which the index $i$ refers to the $i$th thin lens.

Figure 2:
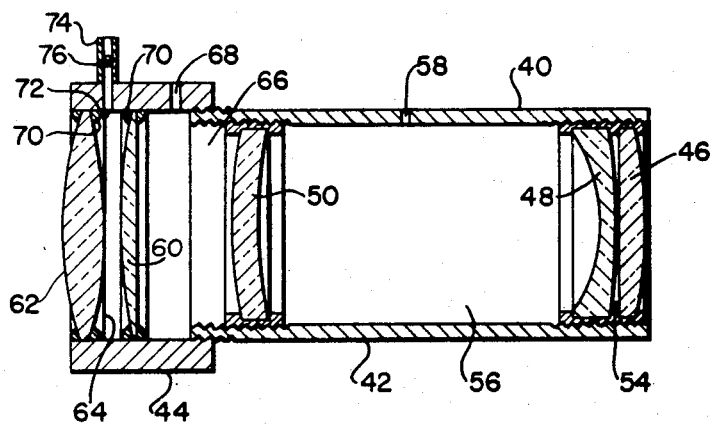
FIG. 2 is an axial sectional schematic view through an optical lens system embodying the principles of the present invention.

Now referring to FIG. 2, there is schematically shown an exemplary embodiment of a lens system incorporating the principles of the present invention and which includes the usual lens barrel or hollow cylindrical housing 40. In this instance, housing 40 is formed of two cylindrical portions 42 and 44 having abutting ends threadedly engaged. One portion 42 supports interiorly thereof three lens elements 46, 48, and 50 held in proper optical alignment by threaded retainer rings 52. Elements 46, 48, and 50 are spaced from one another and, therefore, in conjunction with portion 42, define air spaces 54 and 56. These air spaces are vented to the ambient atmosphere around the lens barrel as by vent 58 for space 56, the vent to space 54 not being shown. Usually, venting will occur from these air spaces by leakage around the retainer rings, but in the present device it is desirable to provide special vents to insure that the air pressure in the vented spaces quickly tracks that of the ambient atmosphere.

Housing portion 44 supports a pair of optically aligned lens elements 60 and 62 which are separated by air space 64. Thus, elements 60 and 50 also are separated by an air space 66 which is vented to the outside atmosphere, through vent 68. Air space 64, however, is sealed from the ambient atmosphere. Typically, lens elements 60 and 62 are mounted within portion 44 with hermetic seal 70, as by silicone or epoxy cement, rubber pressure gaskets or the like, capable of withstanding a fairly large pressure differential e.g. a few atmospheres.

Means are provided for establishing and maintaining a predetermined constant (i.e. neglecting changes due to temperature) air pressure in space 64 independent of ambient air pressure changes. To this end opening 72 is provided in one side of housing portion 44 intermediate the positions of lens elements 60 and 62, as by drilling through portion 44. Opening 72 is preferably connected to the interior of tube 74 mounted in otherwise hermetically sealed relation on portion 44. Air is injected into or removed from space 64 through tube 74 until the pressure in space 64 reaches the desired value and tube 74 sealed off as by closure of valve 78, crimping tube 74 or other known techniques.

Now for ideal isothermal conditions of the ambient atmosphere, i.e. the atmosphere outside of air space 64, it will be appreciated that pressure changes of the ambient atmosphere will not affect the pressure within space 64 and the latter pressure remains constant. Under such circumstances, the refracting surfaces of the lenses bounding space 64 approximate the conditions set forth in Equation 6 and can be considered as contributing nothing to any change in the image plane of the lens system due to ambient pressure change. Thus, the design problem of the lens system is considerably reduced, these surfaces dropping out of Equation 7.

While the lens system can be designed so that focal shifts due to the surfaces not bounding the controlled air space or spaces are minimized, it will be appreciated that this approach ignores the desirability or need to design the system to overcome a number of the usual aberrations. Hence, in some instances, it is desirable to use a variable rather than a constant air pressure in one or more air spaces. The present invention therefore includes in one embodiment, means for monitoring the pressure, the temperature or both, of the ambient atmosphere, and means for controlling the air pressure in an otherwise sealed air space in accordance with the monitored parameters.

Figure 3:
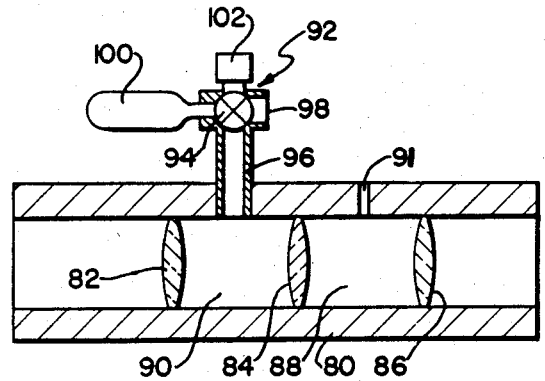
FIG. 3 is a schematic view of another embodiment of the present invention, partly in axial section through an optical lens system, and partly in block diagram.

To this end, in FIG. 3 there is shown another exemplary embodiment of the present invention including lens barrel 80 formed of a strong, substantially rigid material. Mounted within barrel 80 in sealed relation to the interior thereof are a plurality of lenses, 82, 84, and 86 which, together with barrel 80, define inter-lens spaces 88 and 90. Space 88 is vented to the ambient atmosphere, as through opening 91 in the lens barrel. Space 90 is, however, coupled to means 92 for controlling fluid pressure in space 90. Typically, means 93 comprises valve 94 adapted to be operable for connecting conduit 96, leading from the valve to space 90, either to the ambient atmosphere, as a port 98, or to a source of high pressure air such as compressed air cylinder 100. Valve 94 is connected to be operable in a known manner responsively to means such as transducer 102, for monitoring the ambient air characteristics. Thus, transducer 102 may be pressure sensitive, temperature sensitive or the like.

When for example, the outside pressure to which transducer 102 responds falls, valve 94 moves to allow air from cylinder 100 to leak into space 90 until pressure in the latter builds up to a desired value. Should the outside air pressure now increase, the valve responsive to transducer 102 now leaks air out of space 90 to port 98 until again the pressure in space 90 reaches its desired value.

The criteria for establishing the desired pressures can be determined as follows:

Assume a multiple air-space lens system in which the air spaces labeled $i$ are not controlled and the pressure therein is $p_i$, and in which air pressure in spaces labeled $j$ is controlled at a pressure $p_j$. From Equation 5 it will be seen that, to correct for the shift in focal plane with pressure, one must have:

(8)
$$f(p_i) = -\left[\frac{\sum_{j=1}^{m} \pm h_i D_i P_i}{\sum_{i=1}^{n} \pm h_i D_i P_i}\right] f(p_j)$$

(9)
$$d\mu = \frac{\mu_o - 1}{760}$$

and $p = \alpha p$.

Where $\mu_o$ is the refractive index of air at temperature $t_o$ and at a pressure of 760 mm. Hg, Equation 8 becomes

(10)
$$p_i = -\left[\frac{\sum_{j=1}^{m} \pm h_i D_i P_i}{\sum_{i=1}^{n} \pm h_i D_i P_i}\right] p_j$$

It will be apparent that the pressure controlled air spaces can also be used to control focal shifts due to variation in operating temperatures. The equations become more complicated, but the focal shift can be determined experimentally, and the selection of air spaces to be controlled and the transducer and valve settings for compensation can be designed with these empirical data.

Illustration of operation of the invention can be made with actual data of an $f=24''$ lens system having five lenses and four air spaces, the design data for which are as follows:

| | R | t | n |
|---|---|---|---|
| 1 | 2.1180363 | .0281392 | 1.6349490 |
| 2 | .0924550 | .0169268 | 1.0000000 |
| 3 | 2.4753248 | .0281063 | 1.6892880 |
| 4 | 1.7768042 | .0473124 | 1.0000000 |
| 5 | 1.5725479 | .0150100 | 1.6316720 |
| 6 | 3.2372499 | .0921599 | 1.0000000 |
| 7 | .6938270 | .0188103 | 1.5117960 |
| 8 | 2.5798178 | .0001455 | 1.0000000 |
| 9 | 2.6444785 | .0348748 | 1.6175660 |
| A | 2.8866276 | .0000000 | 1.0000000 |

R, $t$ and $n$ respectively are the curvature of the enumerated surface (i.e. $1/r$ where $r$ is the radius of curvature); the distance to the next surface along the optical axis of the system; and the index of refraction of the medium next adjacent the enumerated surface. These data are for power $+1$ and the system has a back focal length $=0.8721426$.

From these data, using the foregoing equations, we find for each surface:

|   | $-hDP$ | $-hDP\frac{(\Delta\mu'-\Delta\mu)}{(\mu'\quad\mu)} -)\text{air}$ $\Delta\mu_{air}$ |
|---|---|---|
| 1 | $-2.118041$ | $+2.118041$ |
| 2 | $+1.45961$ | $+1.457961$ |
| 3 | $-.912214$ | $+.912214$ |
| 4 | $+.287821$ | $+.287821$ |
| 5 | $+2.597106$ | $-2.597106$ |
| 6 | $-2.498330$ | $-2.498330$ |
| 7 | $+.056939$ | $-.056939$ |
| 8 | $-3.592581$ | $-3.592581$ |
| 9 | $-3.642267$ | $+3.642267$ |
| A | $+3.067816$ | $+3.067816$ |

If all air spaces are vented to the atmosphere, then $$C_{air} = +2.741164 \Delta\mu$$

On the other hand, if, as in the embodiment of FIG. 1, the first air space is sealed at constant internal pressure and all other air spaces are open, then $$C_{air} = +0.270989 \Delta\mu$$

an improvement by almost an order of magnitude.

If now, the first air space has its pressure controlled according to Equation 10, $$C_{air} = 0.156521 \Delta p$$

Where one wishes to compute the change in focus with temperature to compensate therefor, consideration should be given to the change in the refractive index of air with temperature. The term "air" as used herein should be construed to include any transparent fluid that constitutes the environment of the system and typically can be $CO_2$, $N_2$ or the like.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:
1. An optical system compensated to reduce focal shifts with variations of pressure or temperature in the ambient atmosphere, and comprising in combination:
   a lens housing;
   a plurality of lens elements mounted within said housing so as to define a multiplicity of air spaces between said elements, at least one of said air spaces being sealed so as to prevent continuous direct communication with said ambient atmosphere, at least one other of said air spaces being vented to provide continuous direct communication with said atmosphere,
said lens being designed such that, despite said variations, the sum

$$\sum_{i=1}^{n} h_i D_i P_i$$

for the $n$ surfaces of said elements tends toward zero, where for the $i^{th}$ refractive surface of said system, $h$ is the distance normal to the optical axis of the system from the intersection of a given paraxial ray and the surface, $D$ is the angular deviation of said ray due to refraction at said $i^{th}$ surface, $p_i$ is $$\frac{\mu\mu'}{\mu'-\mu}$$

$\mu$ and $\mu'$ respectively being the indices of refraction of the lens material and the air on respective sides of said $i^{th}$ surface.

2. An optical system as defined in claim 1 including means for monitoring a parameter of the ambient atmosphere, and means responsive to said monitoring means for varying air pressure in said sealed air spaces as a function of said parameter.

3. An optical system as defined in claim 2 wherein said monitoring means measures changes in the pressure of the ambient atmosphere, and said means for varying the air pressure in said sealed air space comprises a source of air at super-atmospheric pressure and valve means movable responsively to said monitoring means for selectively connecting said sealed air space with said source, with said ambient atmosphere, or for sealing said sealed air space from either said source or said ambient atmosphere.

4. An optical system as defined in claim 3 wherein the pressure, $p_j$, in said sealed air space is adjusted such that $$(p_j) = -\left[\frac{\sum_{j=1}^{m} \pm h_i D_i P_i}{\sum_{i=1}^{n} \pm h_i D_i P_i}\right](p_i)$$

where $p_i$ is said ambient atmospheric pressure, $m$ is the number of lens surfaces bordering sealed air spaces and $n$ is the number of lens surfaces exposed to said ambient atmosphere.

References Cited

UNITED STATES PATENTS

| 1,968,267 | 7/1934 | Straubel | 350—179 X |
| 2,080,120 | 5/1937 | Everett | 350—253 X |
| 2,470,455 | 5/1949 | Avila | 95—45 |
| 3,371,978 | 3/1968 | Matovich | 350—180 X |

JOHN K. CORBIN, Primary Examiner

U.S. Cl. X.R.

95—12.5; 350—253